(12) United States Patent
Thomas et al.

(10) Patent No.: US 12,381,852 B2
(45) Date of Patent: Aug. 5, 2025

(54) PROVIDING DYNAMIC NETWORK SECURITY BASED ON IMPORTANCE OF PROPRIETARY CONTENT

(71) Applicant: INTERNATIONAL BUSINESS MACHINES CORPORATION, Armonk, NY (US)

(72) Inventors: Binoy Thomas, Kozhikode (IN); Sudheesh S. Kairali, Kozhikode (IN); Malarvizhi Kandasamy, Bangalore (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 18/160,683

(22) Filed: Jan. 27, 2023

(65) Prior Publication Data
US 2024/0259351 A1 Aug. 1, 2024

(51) Int. Cl.
*H04L 9/40* (2022.01)

(52) U.S. Cl.
CPC ........ *H04L 63/0414* (2013.01); *H04L 63/102* (2013.01); *H04L 63/105* (2013.01)

(58) Field of Classification Search
CPC . H04L 63/0414; H04L 63/102; H04L 63/105; G06F 21/606; G06F 21/60
See application file for complete search history.

(56) References Cited

U.S. PATENT DOCUMENTS

| | | | |
|---|---|---|---|
| 10,999,312 B2 | 5/2021 | Indira | |
| 11,012,520 B2 | 5/2021 | Gunjal | |
| 11,057,393 B2 * | 7/2021 | Coffing | G06Q 20/40 |
| 11,134,059 B2 | 9/2021 | Barton | |

(Continued)

FOREIGN PATENT DOCUMENTS

| | | |
|---|---|---|
| CN | 112671861 A | 4/2021 |
| WO | 2022103681 A1 | 5/2022 |

OTHER PUBLICATIONS

C. Gerking and D. Schubert, "Component-Based Refinement and Verification of Information-Flow Security Policies for Cyber-Physical Microservice Architectures," 2019 IEEE International Conference on Software Architecture (ICSA), Hamburg, Germany, 2019, pp. 61-70 (IEEE 2019) (Year: 2019).*

(Continued)

*Primary Examiner* — Theodore C Parsons
(74) *Attorney, Agent, or Firm* — Lily Neff

(57) ABSTRACT

A method, computer system, and a computer program product are provided for establishing security measures for a content. In one embodiment, the method comprises identifying at least a microservice chain in a network computer. Each microservice chain has more than one microservice linked to one another and each microservice includes a plurality of applications bundled together. Any use profiles associated with the microservice chain are identified and all data entry points into each microservice are determined. Each microservice is analyzed to predict when each microservice in the chain will provide a confidential output. Once any microservice chain is deemed to be providing a confidential output, any predicted exits in the microservice deemed to be generating an output content are upgraded so that all predicted exists provide a confidential output.

20 Claims, 4 Drawing Sheets

(56) References Cited

U.S. PATENT DOCUMENTS

| | | | | |
|---|---|---|---|---|
| 2018/0027006 | A1* | 1/2018 | Zimmermann | H04L 63/0227 726/11 |
| 2019/0207954 | A1 | 7/2019 | Ahuja | |
| 2021/0392477 | A1 | 12/2021 | Taft | |
| 2022/0050897 | A1* | 2/2022 | Gaddam | G06N 3/006 |
| 2024/0259351 | A1* | 8/2024 | Thomas | H04L 63/105 |

OTHER PUBLICATIONS

Chandramouli, et al., "Attribute-based Access Control for Microservices-based Applications Using a Service Mesh", NIST Special Publication 800-204B, Aug. 2021, 41 pgs., Retrieved from the Internet: <https://csrc.nist.rip/external/nvlpubs.nist.gov/nistpubs/SpecialPublications/NIST.SP.800-204B.pdf>.

IBM, "Service Mesh on Red Hat OpenShift on IBM Cloud", IBM.com, Last Updated Sep. 22, 2022, 17 pgs., Retrieved from the Internet: <https://www.ibm.com/cloud/blog/service-mesh-on-red-hat-openshift>.

James, "Automated Data Classification Tools & Automation Software", BoldonJames.com, [Jan. 4, 2023], 5 pgs., Retrieved from the Internet: <https://www.boldonjames.com/data-classification/automated-classification/>.

Machupalli, "Service Mesh on Red Hat OpenShift", Jun. 2, 2020, 4 pgs., Retrieved from the Internet: <https://cloud.ibm.com/docs/solution-tutorials?topic=solution-tutorials-openshift-service-mesh>.

Nagendra, et al., "Coordinated Dataflow Protection for Ultra-High Bandwidth Science Networks", ResearchGate, ACSAC '19, Dec. 9-13, 2019, San Juan, PR, USA, 17 pgs., <https://www.researchgate.net/publication/337457518>.

Sotnikov, "Data Classification: What It Is and How to Implement It", Netwrix, [accessed Jan. 13, 2023], 25 pgs., Retrieved from the Internet: <https://blog.netwrix.com/2020/09/02/data-classification/>.

* cited by examiner

PROVIDING DYNAMIC NETWORK SECURITY BASED ON IMPORTANCE OF PROPRIETARY CONTENT

BACKGROUND

The present invention relates generally to the field of digital security and data management, and more particularly to techniques for providing dynamic network security based on predicted level of confidentiality.

Data security of content may be assessed depending on the sensitivity of information in the content. Not all data needs to be protected in the same way. Keeping data at the highest level of security can be expensive, impractical and affect the perception of confidentiality of other data. For example, if ordinary data being kept at a highest level of confidentiality, employees in an organization that require the data from time to time, may not be able to view it easily. Having to get authorization may be cumbersome and cause delays. Similarly, if all data are treated as confidential, the difference between very important data and data that may be truly sensitive cannot be appreciated and confidentiality will lose its meaning.

Consequently, it is important to have different classification of data with corresponding security measures to provide access. In a large landscape, however, there may be multiple dependencies depending on the application landscape. Therefore, appropriate data management and security measures must be provided that account for these multiple dependencies.

SUMMARY

Embodiments of the present invention disclose a method, computer system, and a computer program product for establishing security measures for a content. In one embodiment, the method comprises identifying at least a microservice chain in a network computer. Each microservice chain has one or more linked microservices. Each microservice includes a plurality of applications bundled together. Any user profiles associated with the microservice chain are identified and all data entry points into each microservice are determined. Each microservice is analyzed to predict when each microservice in the chain will provide a confidential output. Once any microservice chain is deemed to be providing a confidential output, any predicted output exits in the microservice deemed to be generating a confidential output content.

BRIEF DESCRIPTION OF THE SEVERAL VIEWS OF THE DRAWINGS

These and other objects, features and advantages of the present invention will become apparent from the following detailed description of illustrative embodiments thereof, which may be to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
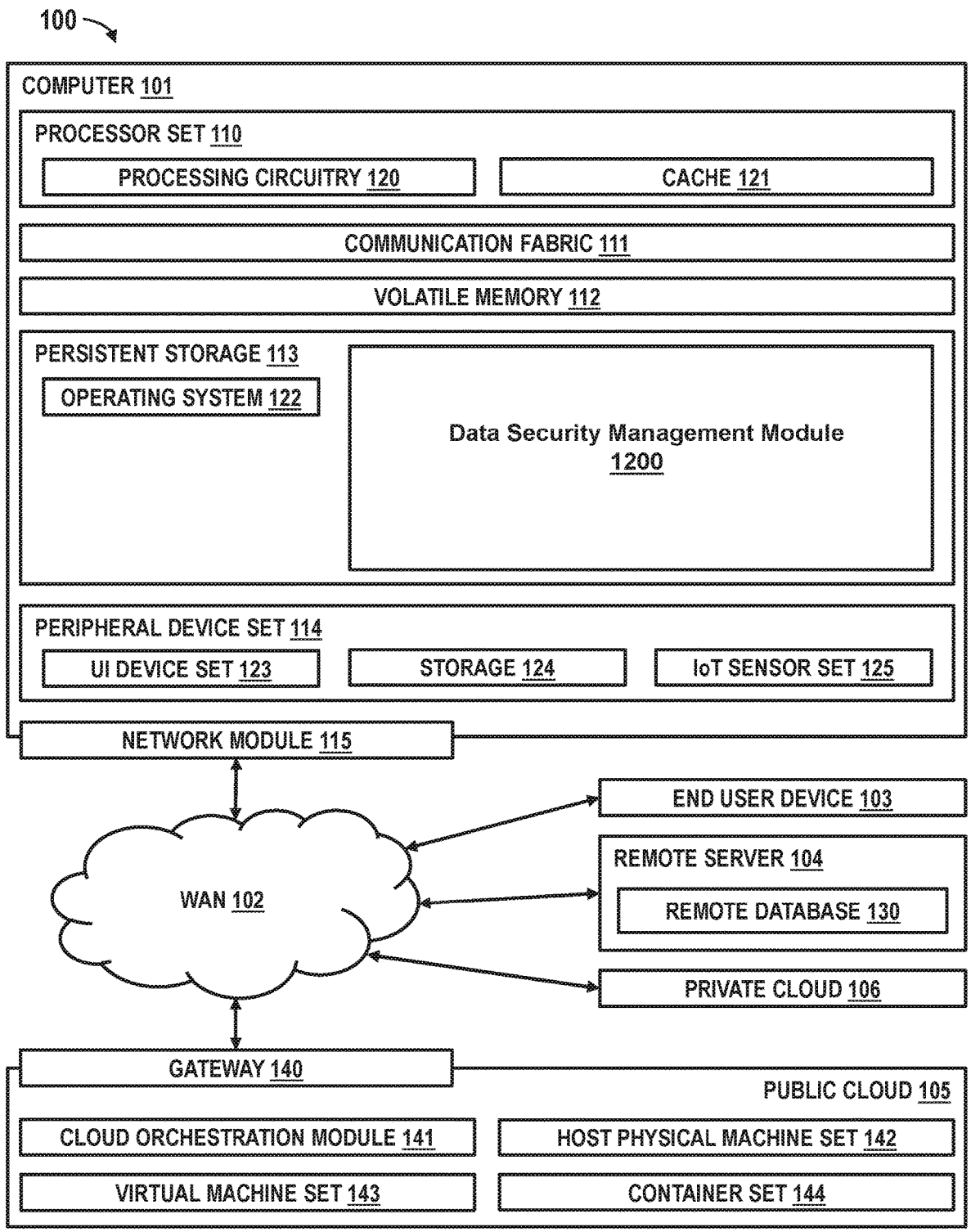
FIG. 1 illustrates a networked computer environment according to at least one embodiment.

Detailed embodiments of the claimed structures and methods may be disclosed herein; however, it can be understood that the disclosed embodiments may be merely illustrative of the claimed structures and methods that may be embodied in various forms. This invention may, however, be embodied in many different forms and should not be construed as limited to the exemplary embodiments set forth herein. Rather, these exemplary embodiments may be provided so that this disclosure will be thorough and complete and will fully convey the scope of this invention to those skilled in the art. In the description, details of well-known features and techniques may be omitted to avoid unnecessarily obscuring the presented embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 provides a block diagram of a computing environment 100. The computing environment 100 contains an example of an environment for the execution of at least some of the computer code involved in performing the inventive methods, such as code change differentiator which is capable of providing a data security management module (1200). In addition to this block 1200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 1200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 of FIG. 1 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 1200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In a computing environment, having multiple applications that may reside locally and/or remotely, content may be shared across platforms and nodes. In such landscapes, there may also be a plurality of microservices across these many applications. In some instances, the multiple microservices may be communicating with one another, an upstream and/or downstream relationship. A microservice may be defined as a bundled set of applications. Microservices can also be linked to one another to form microservice links. Data may also be moving from one microservice to another microservice. This relationship may be as per a data flow logic. In some embodiments, multiple parallel data streams may be flowing in such scenarios and across one or more application landscape. Content and data that is flowing in such instances may have one or more sensitivity statuses. To provide an case of understanding, table 1 below, provides some of these sensitivity statuses and a brief possible definition associated with them.

| Classification | Definition | Security |
|---|---|---|
| Restricted | Data should be classified as Restricted when the unauthorized disclosure, alteration or destruction of that data could cause a significant level of risk to the user/customer of the system. Examples of Restricted data include data protected by state or federal privacy regulations and data protected by confidentiality agreements. | The highest level of security controls should be applied to Restricted data. |
| Private | Data should be classified as Private when the unauthorized disclosure, alteration or destruction of that data could result in a moderate level of risk to the user/customer of the system. By default, all Institutional Data that is not explicitly classified as Restricted or Public data should be treated as Private data | A reasonable level of security controls should be applied to Private data. |
| Public | Data should be classified as Public when the unauthorized disclosure, alteration or destruction of that data would result in little or no risk to the user/customer of the system. Examples of Public data include press releases, course information and research publications. | While little or no controls are required to protect the confidentiality of Public data, some level of control is required to prevent unauthorized modification or destruction of Public data. |

Embodiments of the present invention disclose a method, computer system, and a computer program product for establishing security measures for a content. In one embodiment, the method comprises identifying at least a microservice chain in a network computer. Each microservice chain has more than one microservice linked to one another and each microservice includes a plurality of applications bundled together. Any use profiles associated with the microservice chain may be identified and all data entry points into each microservice may be determined. Each microservice may be analyzed to predict when each microservice in the chain will provide a confidential output. Once any microservice chain may be deemed to be providing a confidential output, any predicted exits in said microservice deemed to be generating an output content may be upgraded so that all predicted exists provide a confidential output.

Figure 2:
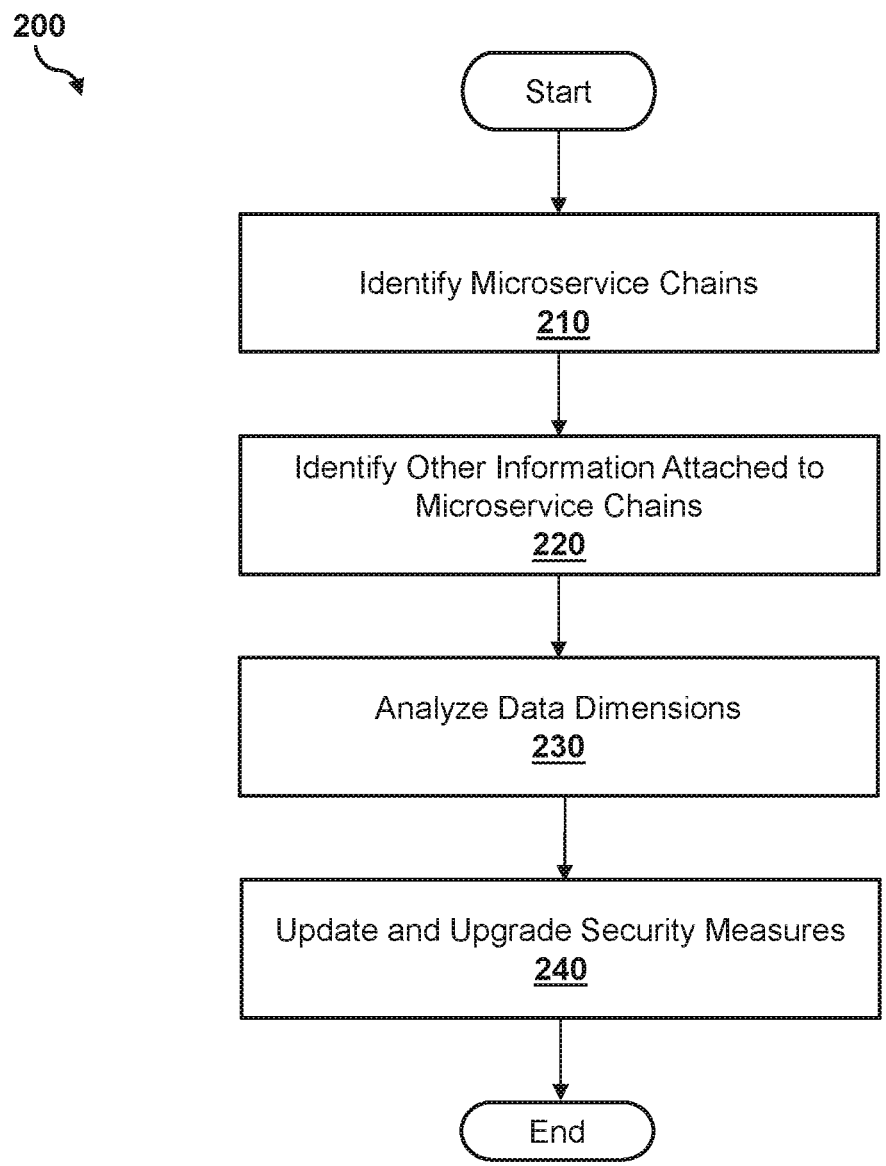
FIG. 2 provides an operational flowchart for a data security management system according to one embodiment.

FIG. 2 provides a flowchart depiction of a security management process 200. In Step 210, one or more microservice chains may be identified. In one embodiment, each microservice chain has more than one microservice linked to one another and each microservice includes a plurality of applications bundled together. There could be multiple microservices or microservice chains associated with one or more users (or user profiles). User can be a person or an entity or device.

In Step 220, other information attached to microservice chains may be identified. In one embodiment, all possible microservice chains may be identified per user profile and per entry points. In one embodiment, in these chains, the microservices will be identified which alternatively have 1) non confidential inputs; or 2) have generated at least one confidential outcome.

Figure 3:
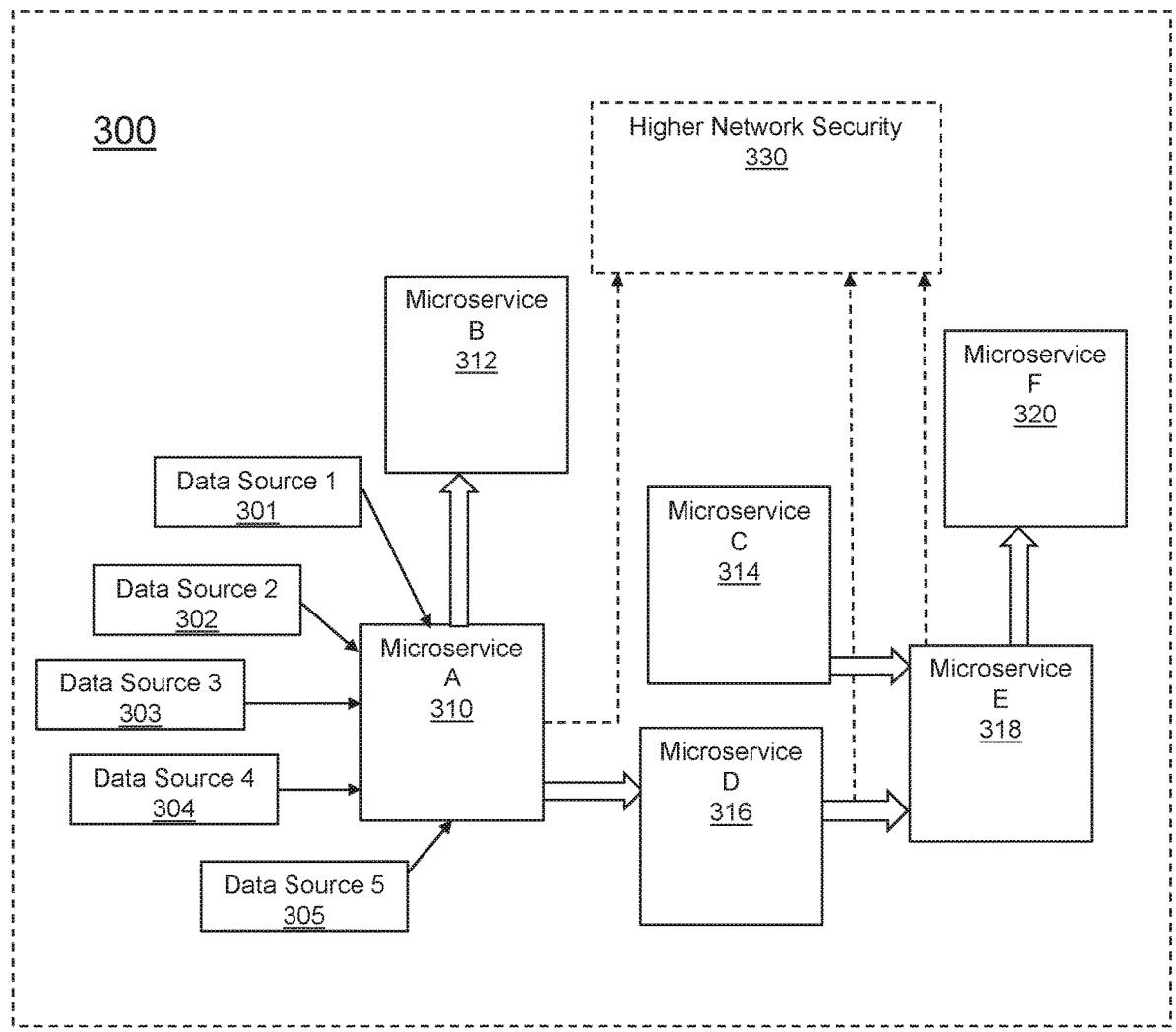
FIG. 3 provides a block diagram illustrating a service mesh with interconnected microservices according to an embodiment.

FIG. 3 is provided to visually emphasize the interconnectivity between these services. In the service mesh 300, various microservices may be interconnected. In the example of FIG. 3, 6 Microservices A-F 310, 312, 314, 316, 318 and 320 have been shown. Individual data sources 1-5 are respectively provided by numerals 301, 302, 303, 304 and 305. In this scenario, individual data sources are not deemed to be confidential. Microservice A (310) may have an Artificial In-telligence (AI) algorithm and can discover confidential correlation amongst data. Data from Microservice A (310) flows through Microservice B (312), Microservice D (316), Microservice E (318) and Microservice F (320). Therefore, in this scenario, additional security will be embedded in the network 330.

In Step 230, data dimensions may be analyzed. In one embodiment, the system will check the data dimensions all possible inputs (aggregated or otherwise) and user profiles and will predict the "WINDOWS" in which these confidential data may flow. The windows may be like exit points where output content can be requested or presented. Taking Step 220 and 230 together, the process help analyze each microservice may be analyzed to predict when each microservice in the chain will provide a confidential output.

In Step 240, the security measures may be updated and upgraded. In one embodiment, the system may dynamically upgrade the security measures between the connected microservices based on the identified "WINDOWS", these measures may be upgraded in a microservice which might not have received data so far. In short, any microservice chain may be deemed to be providing a confidential output, any predicted exits in said microservice deemed to be generating an output content may be upgraded so that all predicted exists provide a confidential output.

Figure 4:
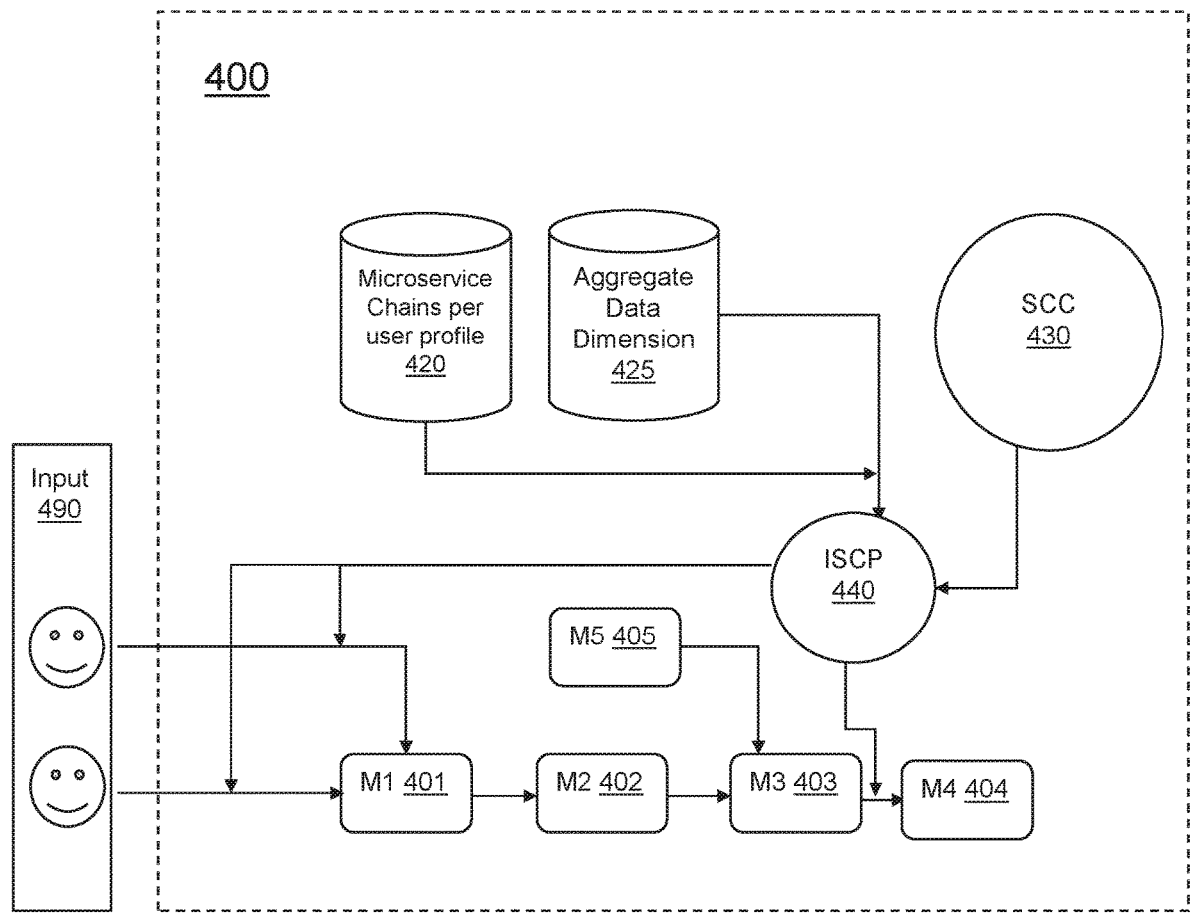
FIG. 4 provides a block diagram illustrating an example of a further implementation according to embodiment of FIG. 2.

FIG. 4 provides an example where further implementation steps can be provided in ac-cordance with the steps of FIG. 2. In one embodiment, FIG. 4 can be used as an extension to a service mesh architecture 400 (hereinafter service mesh). In one embodiment, this service mesh 400 may keep track of all the possible microservice chains per user profile.

Input 490 may be received as shown and can come from users or other entities. In this embodiment, there may be two users providing non confidential input data.

Service mesh will keep measuring confidentiality of input and output of each microservice (420 such as per user profile). Output could be a data sent to another microservice or re-turn value. Or it could be data send to database or external dependencies. In one embodiment, each microservice chain where user data may be entering into service mesh, corresponding proxy will analyze the data dimensions (shown at 425) of the user input and identify the data confidentiality. The inputs M1 to M5 are shown by numerals 401-405 in FIG. 4. However, these will be referenced in the following explanations simply as M1-M5 for ease of understanding.

The service mesh 400 may then identify all the microservices which may be generating confidential data from a non-confidential input. This may be achieved by the Security and Com-pliance Center (SCC 430). SCC 430 can then put in the controls to apply for predicted confidentiality through the Intelligent Security Control Predictor (ISCP 440). In this way the service mesh can dynamically enable/disable security controls.

The service mesh then dynamically enable/disable security controls a predicted confidentiality in a service chain:

$$E.g.: M1 \rightarrow M2 \rightarrow M3 \rightarrow M4$$

In this example, to aid understanding, the service mesh 400 may look for a data cluster and obtain the identification and a protocol address (Cluster ID and Cluster IP). If the service mesh finds that. Cluster ID and Cluster IP (Non confidential) are input to M1, M3 may generate security findings such as suspicious traffic (confidential). However, if it finds that for User 1 there are 100 suspicious traffics identified in last several calls and for User 2 there are 0 suspicious traffic identified, then the service mesh—for user 1—as soon as the call reaches M1 (with Non confidential data)—if dimensions are matching based on historical analysis—the service mesh will provide a call to SCC and adjust security controls for M3→M4 traffic.

In another embodiment, service mesh 400 may keep measuring whether predictions are right and could invalidate predictions if the last N predictions about M3 generating confidential outputs on identified inputs to M1 was wrong.

In some embodiments, this may be treated as an aggregate chain-based prediction as well, such as $$E.g.: M1 \rightarrow M2 \rightarrow M3 \rightarrow M4$$

However, when the call reaches M3, M3 pulls some data from M5:

$$M5 \rightarrow M3 \rightarrow M4$$

Consequently, in some cases, the confidential data output for M3 may depend upon inputs from both M5 and M2.

In such a case the situation may be monitored for all possible input if a confidential output may be detected and predictions will be made based on input combinations from both M5 and M2.

The descriptions of the various embodiments of the present invention have been presented for purposes of illustration but may be not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for establishing security measures for a content, comprising:
   identifying a plurality of microservice chains at in a network computer, wherein each microservice chain has at least two linked microservices and each of the at least two linked microservices includes a plurality of bundled applications;
   identifying said plurality of microservice chains in said network per user profile and per data entry input points, wherein at least a user and any profiles for said user associated with the at least one microservice chain and determining any data entry points into each of the at least one microservice chain;
   analyzing each of the at least two linked microservices to predict when each of the at least two linked microservices in the at least one microservice chain will provide a confidential output;
   once any microservice in the at least one microservice chain is deemed to be providing the confidential output, upgrade any predicted exits in the at least one microservice chain deemed to be generating an output content so that all said predicted exits provide the confidential output.

2. The method of claim 1, wherein said analysis includes checking data dimensions of any possible input and any user profile prior history to determine a data flow in said microservice chain.

3. The method of claim 1, wherein security measures between any of at least two linked services will be upgraded to confidential when at least one of the at least two linked services are deemed to be producing a confidential outcome.

4. The method of claim 3, wherein the at least one microservice chain is modified to add or remove a service, and wherein said service is dynamically upgraded to reflect whether each of its microservices are to provide said confidential outcome.

5. The method of claim 1, wherein data security measures include a plurality of different security levels beside a confidential and a non-nonconfidential level and the at least one microservice chain will upgrade any of said services to a highest level identified amongst the at least one microservice chain.

6. The method of claim 1, wherein a plurality of microservice chains are associated to more than one user.

7. The method of claim 1, further comprising determining confidentiality level of input and output data of each of the at least two linked microservices.

8. A computer system for providing a security measures for a content,
   comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is enabled to perform the steps:
   identifying a plurality of microservice chains at in a network computer, wherein each microservice chain has at least two linked microservices and each of the at least two linked microservices includes a plurality of bundled applications;

identifying said plurality of microservice chains in said network per user profile and per data entry input points, wherein at least a user and any profiles for said user associated with the at least one microservice chain and determining any data entry points into each of the at least one microservice chain;

analyzing each of the at least two linked microservices to predict when each of the at least two linked microservices in the at least one microservice chain will provide a confidential output;

once any microservice in the at least one microservice chain is deemed to be providing the confidential output, upgrade any predicted exits in the at least one microservice chain deemed to be generating an output content so that all said predicted exits provide the confidential output.

9. The computer system of claim 8, wherein said analysis includes checking data dimensions of any possible input and any user profile prior history to determine a data flow in said microservice chain.

10. The computer system of claim 8, wherein security measures between any of at least two linked services will be upgraded to confidential when at least one of the at least two linked services are deemed to be producing a confidential outcome.

11. The computer system of claim 10, wherein the at least one microservice chain is modified to add or remove a service, and wherein said service is dynamically upgraded to reflect whether each of its microservices are to provide said confidential outcome.

12. The computer system of claim 8, wherein data security measures include a plurality of different security levels beside a confidential and a non-nonconfidential level and the at least one microservice chain will upgrade any of said services to a highest level identified amongst the at least one microservice chain.

13. The computer system of claim 8, wherein a plurality of microservice chains are associated to more than one user.

14. The computer system of claim 8, further comprising determining confidentiality level of input and output data of each of the at least two linked microservices.

15. A computer program product for providing security measures for a content, comprising:
one or more computer-readable storage medium and program instructions stored on at least one of the one or more tangible storage medium, the program instructions executable by a processor, the program instructions comprising:

identifying a plurality of microservice chains at in a network computer, wherein each microservice chain has at least two linked microservices and each of the at least two linked microservices includes a plurality of bundled applications;

identifying said plurality of microservice chains in said network per user profile and per data entry input points, wherein at least a user and any profiles for said user associated with the at least one microservice chain and determining any data entry points into each of the at least one microservice chain;

analyzing each of the at least two linked microservices to predict when each of the at least two linked microservices in the at least one microservice chain will provide a confidential output;

once any microservice in the at least one microservice chain is deemed to be providing the confidential output, upgrade any predicted exits in the at least one microservice chain deemed to be generating an output content so that all said predicted exits provide the confidential output.

16. The computer program product of claim 15, wherein said analysis includes checking data dimensions of any possible input and any user profile prior history to determine a data flow in said microservice chain.

17. The computer program product of claim 15, wherein security measures between any of at least two linked services will be upgraded to confidential when at least one of the at least two linked services are deemed to be producing a confidential outcome.

18. The computer program product of claim 15, wherein the at least one microservice chain is modified to add or remove a service, and wherein said service is dynamically upgraded to reflect whether each of its microservices are to provide a confidential outcome.

19. The computer program product of claim 18, wherein data security measures include a plurality of different security levels beside a confidential and a non-nonconfidential level and the at least one microservice chain will upgrade any of said services to a highest level identified amongst the at least one microservice chain.

20. The computer program product of claim 19, further comprising determining confidentiality level of input and output data of each of the at least two linked microservices.

* * * * *